United States Patent [19]
Matthews et al.

[11] Patent Number: 6,158,282
[45] Date of Patent: Dec. 12, 2000

[54] EXTRACTION OF DOUBLE-OSCILLATION-FREQUENCY SINUSOIDS IN VIBRATORY ROTATION SENSORS

[75] Inventors: Anthony Matthews, Santa Barbara; Guy T. Varty, Woodland Hills; Paul C. Nguyen; David D. Lynch, both of Santa Barbara, all of Calif.

[73] Assignee: Litton Systems Inc., Woodland Hills, Calif.

[21] Appl. No.: 09/348,427

[22] Filed: Jul. 7, 1999

[51] Int. Cl.[7] .................................................. G01C 19/00
[52] U.S. Cl. ........................................................ 73/504.13
[58] Field of Search ......................................... 73/504.13

[56] References Cited

U.S. PATENT DOCUMENTS

| | | | |
|---|---|---|---|
| 5,763,780 | 6/1998 | Matthews et al. | 73/504.13 |
| 5,801,310 | 5/1999 | Matthews et al. | 73/504.13 |
| 5,817,940 | 10/1998 | Kobayashi et al. | 73/504.12 |
| 5,827,966 | 10/1998 | Lynch et al. | 73/488 |
| 5,902,930 | 5/1999 | Matthews et al. | 73/504.02 |
| 5,915,276 | 6/1999 | Fell | 73/504.13 |

Primary Examiner—Richard A. Moller
Attorney, Agent, or Firm—Robert E. Malm

[57] ABSTRACT

The invention is a vibratory rotation sensor comprising a housing, a resonator attached to the housing, first and second sets of electrodes, and a signal processor. One set of electrodes are attached to the housing and the other set of electrodes are attached to the resonator, the first set opposing the second set. Each set consists of one or more electrodes. The signal processor has one or more input ports capacitively connected to one or more of the first set of electrodes, the signal processor extracting from the signals appearing at the one or more input ports one or more double-frequency sinusoids having frequencies of twice the frequency of oscillation of the resonator.

21 Claims, 3 Drawing Sheets

EXTRACTION OF DOUBLE-OSCILLATION-FREQUENCY SINUSOIDS IN VIBRATORY ROTATION SENSORS

CROSS-REFERENCE TO RELATED APPLICATIONS (Not applicable)

STATEMENT REGARDING FEDERALLY SPONSORED RESEARCH AND DEVELOPMENT (Not applicable)

BACKGROUND OF THE INVENTION

This invention relates generally to vibratory rotation sensors and more specifically to the extraction of double-frequency sinusoids from vibratory sensor signals, a double-frequency sinusoid having a frequency equal to twice the oscillation frequency of the resonator.

A prior-art vibratory rotation sensor (VRS) 10 consisting of an outer member 12, a hemispherical resonator 14, and an inner member 16, all made of fused quartz and joined together with indium, is shown unassembled in FIG. 1. The inertially-sensitive element is the thin-walled, 5.8-cm-diameter hemispherical resonator 14 positioned between the outer member 12 and the inner member 16 and supported by the stem 26.

A ring forcer electrode 20 and sixteen discrete forcer electrodes 22 are deposited on the interior surface of the outer member 12. In the assembled VRS 10, the ring forcer electrode 20 and the sixteen discrete forcer electrodes 22 are in close proximity to the exterior metalized surface 32 of the hemispherical resonator 14. In the assembled VRS, eight pickoff electrodes 24 deposited on the inner member 16 are in close proximity to the interior metalized surface 30 of the hemispherical resonator 14.

Capacitive forces can be exerted on the hemispherical resonator 14 by means of appropriate forcing voltage differences between the hemispherical resonator 14 and the ring forcer electrode 20 to cause the hemispherical resonator to vibrate in the lowest-order inextensional (or flexing) mode. A standing wave is established having four antinodes at 90-degree intervals about the circumference with four nodes offset by 45 degrees from the antinodes. The 0-degree and 180-degree antinodal points oscillate 90 degrees out of phase with 90-degree and the 270-degree antinodal points. The standing wave causes the shape of the rim of the hemispherical resonator to change from circular to elliptical (with semi-major axis through the 0-degree/180-degree antinodes) to circular to elliptical (with semi-major axis through the 90-degree/270-degree antinodes).

Rotation of the VRS 10 about an axis normal to the plane of the hemispherical-resonator rim 34 causes the standing wave to rotate in the opposite direction with respect to the VRS by an angle proportional to the angle of rotation of the VRS 10. Thus, by measuring the angle of rotation of the standing wave with respect to the VRS 10, one can determine the angle of rotation of the VRS 10.

The vibrational mode of the hemispherical resonator 14 is excited by placing a DC bias voltage on the hemispherical resonator 14 and an AC voltage on the ring forcer electrode 20, the frequency of the AC voltage being twice the resonant frequency of the hemispherical resonator 14.

The standing-wave pattern angle with respect to the VRS 10 is determined by measuring the currents that flow into and out of the pickoff electrodes 24 as the hemispherical resonator 14 vibrates and the capacitances of the pickoff electrodes 24 with respect to the hemispherical resonator vary. An x axis signal $I_x$ is obtained from the combination $I_0-I_{90}+I_{180}-I_{270}$ where the subscripts identify the angular orientations relative to the x axis of the electrodes from which the currents originate. Similarly, a y axis signal $I_y$ is obtained from the combination $I_{45}-I_{135}+I_{225}-I_{315}$. The tangent of twice the standing-wave pattern angle with respect to the 0-degree (i.e. x) axis is given by the ratio of $I_y$ to $I_x$.

As a result of nonuniformities in the thickness of the hemispherical resonator 14, the establishment of a first standing wave will lead to the development of a second standing wave oscillating in phase quadrature with antinodes coinciding with the nodes of the first standing wave. The development of a second standing wave can be inhibited by placing appropriate voltages on the sixteen discrete forcer electrodes 22.

A DC vias voltage is typically maintained on the hemispherical resonator 14 in order to reduce the magnitudes of the AC forcing voltages applied to the ring forcer electrode 20 and the discrete forcer electrodes 22 and to make the force exerted on the resonator a linear function of the AC driving voltages. The presence of the DC bias voltage results in slow changes in the electrical properties of the VRS which have been attributed to capacitance changes caused by charge-migration phenomena taking place at or within the outer member 12 and the inner member 16. These slow changes have resulted in an unacceptably large performance degradation over time and special means have to be provided to compensate for these effects.

BRIEF SUMMARY OF THE INVENTION

The invention is a vibratory rotation sensor comprising a housing, a resonator attached to the housing, first and second sets of electrodes, and a signal processor. One set of electrodes are attached to the housing and the other set of electrodes are attached to the resonator, the first set opposing the second set. Each set consists of one or more electrodes. A signal processor having one or more input ports capacitively connected to one or more of the first set of electrodes, the signal processor extracting from the signals appearing at the one or more input ports one or more double-frequency sinusoids having frequencies of twice the frequency of oscillation of the resonator.

DETAILED DESCRIPTION OF THE INVENTION

The invention is a vibratory rotation sensor for which the control and readout is accomplished with multiplexed signals which can accommodate a wide variety of novel electrode placements. The vibratory rotation sensor of the present invention consists of a resonator, a housing to which the resonator is attached, and multiplex electronics. The resonator can be any rotationally-symmetric thin-walled object having standing-wave vibration modes. The prior art typically suggests that the resonator be hemispherical in shape.

Figure 1:
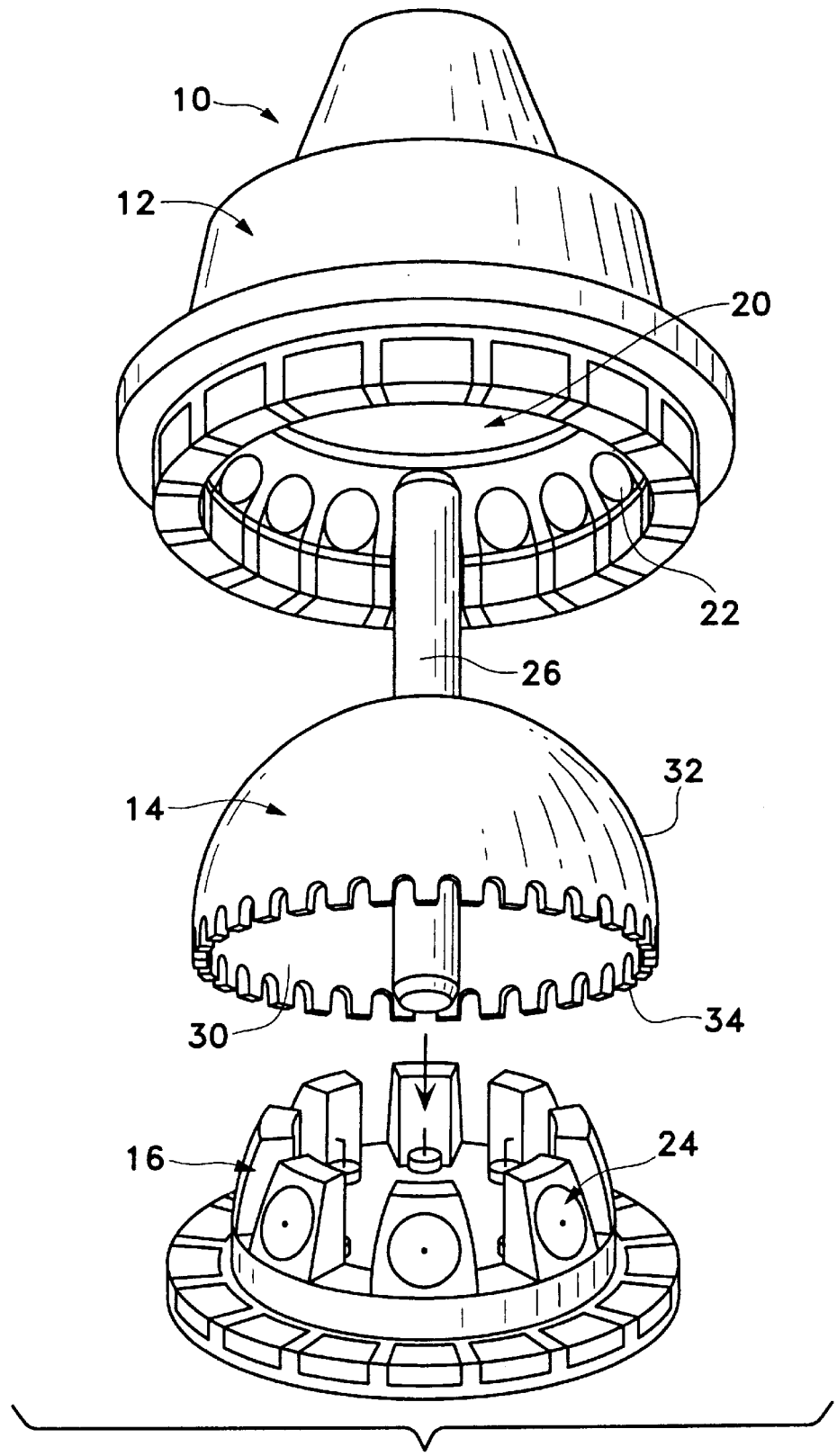
FIG. 1 shows the structure of a prior-art vibratory rotation sensor.
Figure 2:
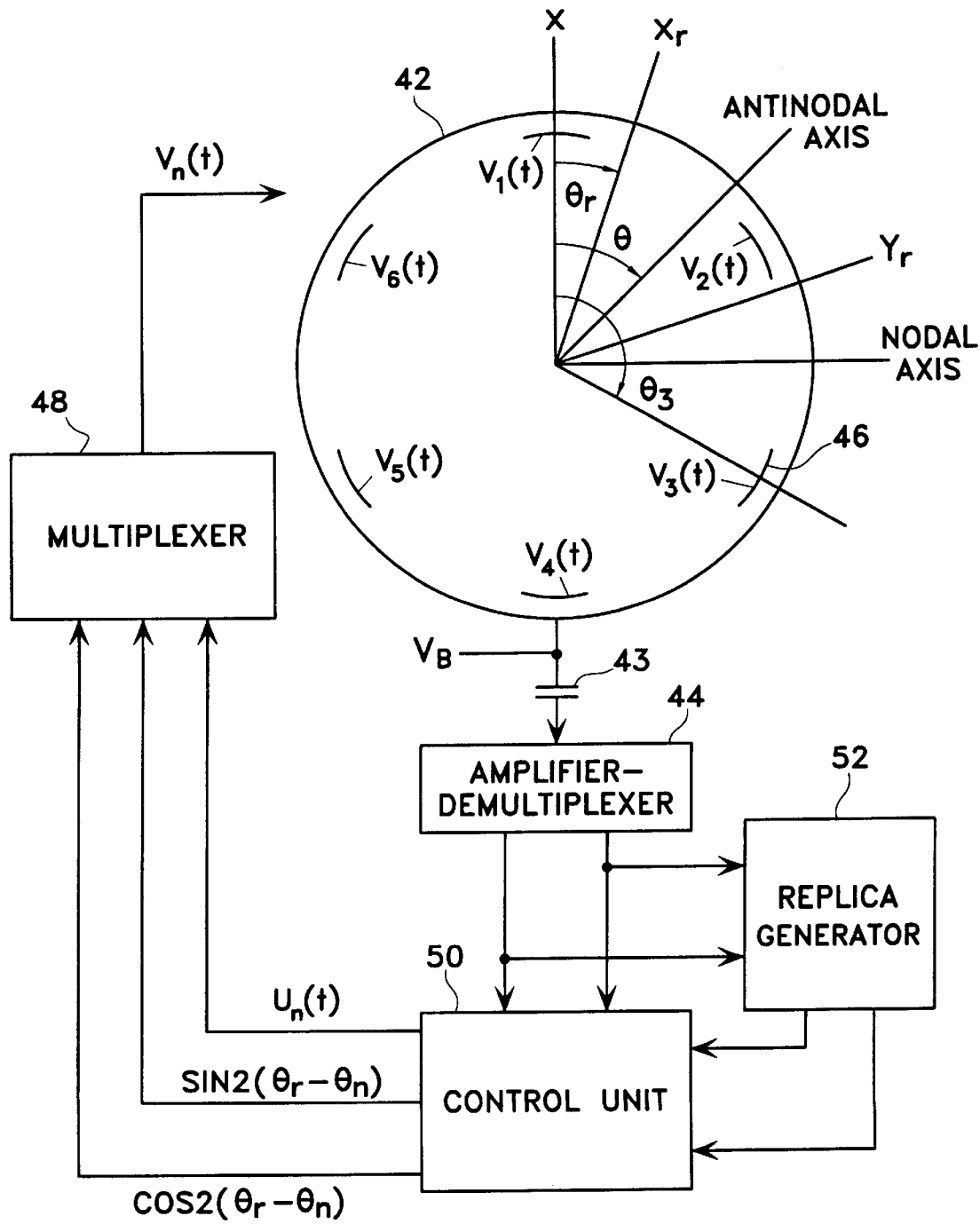
FIG. 2 shows a block diagram of the control and readout electronics for the invention.

A simplified method for determining the parameters of the standing waves and controlling the dynamics of the resonator is illustrated in FIG. 2. The standing waves are describable with respect to x and y axes fixed with respect to the resonator. The orientation of the inphase standing wave with respect to the resonator can be specified by the orientation angle $\theta$ of an inphase antinodal axis measured clockwise from the x axis. The deviation of the resonator rim from a circle along the inphase antinodal axis is assumed to vary as $\cos(\omega t+\phi)$ where $\omega$ is the vibration frequency, t is time, and $\phi$ is an arbitrary phase angle. The orientation of the quadrature standing wave with respect to the resonator is specified by the orientation angle $\theta+\pi/4$ of a quadrature antinodal axis measured clockwise from the x axis. The deviation of the resonator rim from a circle along the quadrature antinodal axis is assumed to vary as $\sin(\omega t+\phi)$.

The circumferentially-continuous resonator electrode 42, deposited on the interior surface of the resonator, is biased to a DC voltage or low-frequency AC voltage $V_B$ and is connected through a DC-blocking capacitor 43 to the amplifier-demultiplexer 44. A plurality N of electrodes 46 attached to the VRS housing are spaced about the circumference in close proximity to the resonator electrode 42. The angular position of the n'th electrode measured clockwise from the x-axis is denoted by $\theta_n$ where n takes on the values from 1 to N. The n'th electrode is supplied with the driving voltage $V_n(t)$ from the multiplexer 48 where $$V_n(t)=V_{mxr}(t)\cos(2\theta_r-2\theta_n)\cos(\omega_{xr}t+\psi_{xr})-V_{myr}(t)\sin(2\theta_r-2\theta_n)\cos(\omega_{yr}t+\psi_{yr})+V_{cn}(t)U_n(t) \quad (1)$$

The excitation voltages $V_{mxr}(t)\cos(\omega_{xr}t+\psi_{xr})$ and $V_{myr}(t)\cos(\omega_{yr}t+\psi_{yr})$ are components in the $x_r$-$y_r$ tracking-angle coordinate system of FIG. 2 (denoted by the r in the subscripts). The preferred embodiments of the excitation voltages include the sinusoids $\cos(\omega_{xr}t+\psi_{xr})$ and $\cos(\omega_{yr}t+\psi_{yr})$. There are a variety of periodic functions $(F(\omega_{xr}t+\psi_{xr}))$ which may be utilized instead of the sinusoids including ordinary square waves.

The $x_r$-axis is rotated clockwise from the x-axis by the tracking angle $\theta_r$. The excitation voltages are designed not to affect the parameters of a standing wave on the resonator. The angular frequencies $\omega_{xr}$ and $\omega_{yr}$ and phases $\psi_{xr}$ and $\psi_{yr}$ depend on the type of multiplexing being used. The forcing voltages $V_{cn}(t)U_n(t)$ cause forces to be applied to the resonator for the purpose of controlling the parameters of the one or more standing waves on the resonator. The functions $U_n(t)$ are generated by control unit 50 and supplied to multiplexer 48. The voltages $V_{cn}(t)$ are predetermined functions used to isolate the forcing voltages from the excitation voltages.

The current I(t) flowing from the resonator electrode 42 into the amplifier-demultiplexer 44 is given by $$I(t) = \sum_{n=1}^{N} I_n(t) \quad (2)$$

where $$I_n(t) = K_I C_n[V_{mxr}(t)\omega_{xr}\cos(2\theta_r - 2\theta_n)\cos(\omega_{xr}t+\psi_{xr}) - \quad (3)$$
$$V_{myr}(t)\omega_{yr}\sin(2\theta_r - 2\theta_n)\cos(\omega_{yr}t+\psi_{yr}) +$$
$$V_{cn}(t)\omega_{Un}U_n(t)]$$

The capacitances $C_n$ are the capacitances of the electrodes 46 with respect to the resonator electrode 42. The angular frequencies $\omega_{Un}$ are those associated with the corresponding U's and are typically equal to or less than $2\omega$ where $\omega$ is the resonator vibration frequency. The symbol $K_1$ denotes a constant. The phase differences between the driving voltages and the resulting currents are of no relevance and have been ignored in the equations above. The capacitances are given by $$C_n=C_0[1+d_i\cos(2\theta-2\theta_n)\cos(\omega t+\phi)-d_q\sin(2\theta-2\theta_n)\sin(\omega t+\phi)] \quad (4)$$

where terms involving higher orders of $d_i$ and $d_q$ have been omitted. The effects of the higher-order terms are taken into account in subsequent processing operations. The quantity $C_0$ is the capacitance of the electrode pairs when the resonator is not excited, $d_i$ and $d_q$ are the maximum flexing amplitudes respectively of the inphase and quadrature modes divided by the gap between the resonator electrode 42 and the electrodes 46 when the resonator is not excited, $\theta$ is the angle between the antinode of the inphase standing wave and the x-axis, $\omega$ is the angular frequency of vibration of the resonator, and $\phi$ is an arbitrary phase angle.

Substituting the expressions for the capacitances in the current equation, we obtain $$I(t) = \frac{N}{2}K_I C_0 V_{mxr}(t)\omega_{xr}\cos(\omega_{xr}t+\psi_{xr})d_i\cos(2\theta-2\theta_r)\cos(\omega t+\phi) - \quad (5)$$
$$\frac{N}{2}K_I C_0 V_{mxr}(t)\omega_{xr}\cos(\omega_{xr}t+\psi_{xr})d_q\sin(2\theta-2\theta_r)\sin(\omega t+\phi) +$$
$$\frac{N}{2}K_I C_0 V_{myr}(t)\omega_{yr}\cos(\omega_{yr}t+\psi_{yr})d_i\sin(2\theta-2\theta_r)\cos(\omega t+\phi) +$$
$$\frac{N}{2}K_I C_0 V_{myr}(t)\omega_{yr}\cos(\omega_{yr}t+\psi_{yr})d_q\cos(2\theta-2\theta_r)\sin(\omega t+\phi) +$$
$$K_I C_0 \sum_{n=1}^{N} V_{mxr}(t)\omega_{xr}\cos(2\theta_r-2\theta_n)\cos(\omega_{xr}t+\psi_{xr}) -$$
$$K_I C_0 \sum_{n=1}^{N} V_{myr}(t)\omega_{yr}\sin(2\theta_r-2\theta_n)\cos(\omega_{yr}t+\psi_{yr}) +$$
$$\sum_{n=1}^{N} K_I V_{cn}(t)\omega_{Un}U_n(t)C_n$$

where it is assumed that $$\sum_{n=1}^{N}\exp(j4\theta_n) = 0 \quad (6)$$

The expression above can be realized in a number of ways. For example, N electrodes could be spaced around the circumference of the VRS at $2\pi/N$ radian intervals for all values of N except 1, 2, and 4. The N electrodes do not have to be uniformly spaced. For example, for N=5, a particular set of values which satisfies equation (6) are $\theta_1=\pi/8$, $\theta_2=\pi/6$, $\theta_3=5\pi/6$, $\theta_4=11\pi/8$, and $\theta_5=2\pi$.

The current I(t) is transformed into the voltage V(t) by the amplifier-demultiplexer 44:

$$V(t) = K_V[V_x(t)R_x(t) + V_y(t)R_y(t)] + \quad (7)$$
$$K_F \sum_{n=1}^{N} V_{cn}(t)\omega_{Un}U_n(t)C_n +$$
$$K_F C_0 \sum_{n=1}^{N} V_{mxr}(t)\omega_{xr}\cos(2\theta_r-2\theta_n)\cos(\omega_{xr}t+\psi_{xr}) -$$

-continued $$K_F C_0 \sum_{n=1}^{N} V_{myr}(t)\omega_{yr}\sin(2\theta_r - 2\theta_n)\cos(\omega_{yr}t + \psi_{yr})$$

where $K_V$ and $K_F$ are constants and $$V_x(t)=V_{mxr}(t)\omega_{xr}\cos(\omega_{xr}t+\psi_{xr})$$

$$V_y(t)=V_{myr}(t)\omega_{yr}\cos(\omega_{yr}t+\psi_{yr}) \quad (8)$$

$$R_x(t)=d_i\cos(2\theta-2\theta_r)\cos(\omega t+\phi)-d_q\sin(2\theta-2\theta_r)\sin(\omega t+\phi)$$

$$R_y(t)=d_i\sin(2\theta-2\theta_r)\cos(\omega t+\phi)+d_q\cos(2\theta-2\theta_r)\sin(\omega t+\phi)$$

The signals $R_x(t)$ and $R_y(t)$ are the desired outputs from a demultiplexing process applied to V(t) since they contain the standing wave parameters $d_i$, $d_q$, $\theta-\theta_r$, $\omega$, and $\phi$.

Signals $S_x(t)$ and $S_y(t)$ containing the signals $R_x(t)$ and $R_y(t)$ are extracted by amplifier-demultiplexer 44. The operating principle of the demultiplexer portion of the amplifier-demultiplexer 44 depends on the form of the voltages $V_{mxr}(t)$, $V_{myr}(t)$, and $V_{cn}(t)$, and the values of $\omega_{xr}$, $\omega_{yr}$, $\psi_{xr}$, and $\psi_{yr}$.

For frequency-division multiplexing $V_{mxr}(t)$, $V_{myr}(t)$, and $V_{cn}(t)$ are all equal to a constant, $\omega_{xr}$, $\omega_{yr}$, and $|\omega_{xr}-\omega_{yr}|$ are greater than about $6\omega$, and $\psi_{xr}$, and $\psi_{yr}$ are arbitrary constants. The signals $R_x(t)$ and $R_y(t)$ which contain the standing-wave parameters are obtained by performing two product demodulations of V(t), one with respect to $\cos(\omega_{xr}t+\psi_{xr})$ and the other with respect to $\cos(\omega_{yr}t+\psi_{yr})$. If a periodic function other than a sinusoid is being used, then the modulations proceed using replicas of the periodic functions. A product demodulation consists of multiplying the input voltage by the reference sinusoid (or replica) and lowpass filtering the product, the cutoff frequency of the lowpass filter being about $3\omega$. The results of the above process are the signals $S_{FDMx}(t)$ and $S_{FDMy}(t)$:

$$S_{FDMx}(t)=K_{FDM}R_x(t)$$

$$S_{FDMy}(t)=K_{FDM}R_y(t) \quad (9)$$

where $K_{FDM}$ is a constant. Because the upper limit to the frequency spectrums of $V_{cn}(t)\omega_{Un}U_n(t)C_n$ are about $3\omega$, these quantities are eliminated by the demultiplexing process. The second and third summations of equation (7) are transformed into (1) signals with frequency spectrums greater than about $3\omega$ and are eliminated in the demultiplexing process and (2) DC terms which are eliminated in subsequent operations.

For phase-division multiplexing, $\omega_{xr}$ and $\omega_{yr}$ have the same value $\omega_o$, $\omega_o$ being greater than about $6\omega$, and $\psi_{xr}-\psi_{yr}$ is equal to $\pi/2$ radians. The signals $S_{PDMx}(t)$ and $S_{PDMy}(t)$ are obtained by performing product demodulations of V(t) with respect to $\cos(\omega_o t+\psi_x)$ and with respect to $\cos(\omega_o t+\psi_y)$ (or with respect to replicas of the periodic functions being used).

$$S_{PDMx}(t)=K_{PDM}R_x(t)$$

$$S_{PDMy}(t)=K_{PDM}R_y(t) \quad (10)$$

where $D_{PDM}$ is a constant.

For one form of time-division multiplexing, $\omega_{xr}$ and $\omega_{yr}$ have the same value $\omega_o$ with $\omega_o$ being greater than about $6\omega$ and $\psi_{xr}$, and $\psi_{yr}$ are equal to an arbitrary number $\psi_o$. The voltages $V_{mxr}(t)$ and $V_{myr}(t)$ are proportional to square waves which take on values of 0 and 1, only one of which being equal to 1 at any given time and the duration of a "1" value being equal to an integer times $2\pi/\omega$. The voltages $V_{cn}(t)$ are both equal to a constant. The signals $S_{TDMx}(t)$ and $S_{TDMy}(t)$ are obtained by performing a product demodulation of V(t) with respect to $\cos(\omega_o t+\psi_o)$ (or replica) followed by parallel multiplications with $V_{mxr}(t)$ and $V_{myr}(t)$:

$$S_{TDMx}(t)=K_{TDM}V_{mxr}(t)R_x(t)$$

$$S_{TDMy}(t)=K_{TDM}V_{myr}(t(R_y(t) \quad (11)$$

where $K_{TDM}$ is a constant. It should be noted that $R_x(t)$ and $R_y(t)$ are available only when $V_{mxr}(t)$ and $V_{myr}(t)$ are non-zero.

The same results are obtained (except possibly for the value of the constant $K_{TDM}$) if $V_{mxr}(t)$, $V_{myr}(t)$ and $V_{cn}(t)$ are proportional to square waves which take on values of 0 and 1, only one of the square waves being equal to 1 at any given time, and the duration of a "1" value being equal to an integer times $2\pi/\omega$. This mode of operation may be desirable in that it completely isolates the forcing voltages $V_{cn}(t)U_n(t)$ from each other and from the excitation voltages $V_{mxr}(t)\cos(\omega_o t+\psi_o)$ and $V_{myr}(t)\cos(\omega_o t+\psi_o)$.

For another form of time-division multiplexing, $\omega_o$ equals 0 and $V_{mxr}(t)$, $V_{myr}(t)$, and $V_{cn}(t)$ are proportional to square waves which take on values of 0 and 1, only one of the square waves being equal to 1 at any given time, and the duration of a "1" value being equal to an integer times $2\pi/\omega$. Multiplying V(t) in parallel operations by $V_{mxr}(t)$ and by $V_{myr}(t)$ gives the same results as in the first form of time-division multiplexing.

For code-division multiplexing, $\omega_{xr}$, $\omega_{yr}$, $\psi_{xr}$, and $\psi_{yr}$ are all equal to 0, $V_{cn}(t)$ are constants, and $V_{mxr}(t)$ and $V_{myr}(t)$ are proportional to square waves which take on pseudo-random sequences of values of $-1/T$ and $1/T$ and satisfy the following conditions:

$$\int_T V_i V_j dt = \begin{cases} 1; & i=j \\ 0; & i \neq j \end{cases} \quad (12)$$

where the subscripts i and j stand for any of the subscripts mxr, myr and cn. The integration time interval T should be less than $2\pi/3\omega$. The signals $S_{CDMx}(t)$ and $S_{CDMy}(t)$ are obtained by separately multiplying V(t) by $V_{mxr}(t)$ and $V_{myr}(t)$ and then integrating over T:

$$S_{CDMx}(nT)=K_{CDM}R_x(nT)$$

$$S_{CDMy}(nT)=K_{CDM}R_y(nT) \quad (13)$$

where $K_{TDM}$ is a constant and n is an integer. It should be noted that the signals $S_{CDMx}(t)$ and $S_{CDMy}(t)$ provide information concerning the standing-wave parameters at intervals of T.

The voltages $U_n(t)$ typically may include three components:

$$U_n(t)=U_{an}(t)+U_{qn}(t)+U_{rn}(t) \quad (14)$$

where the subscripts a, q, and r identify the amplitude, quadrature and rate control voltages. It is not necessary to isolate these components from one another in all applications. However, if isolation is desired, the following substitutions can be made in the foregoing equations.

$$V_{can}(t)U_{an}(t)+V_{cqn}(t)U_{qn}(t)+V_{crn}(t)U_{rn}(t) \text{ for } V_{cn}(t)U_n(t) \quad (15)$$

With these substitutions, any constraints imposed on $V_{cn}(t)$ also apply to $V_{can}(t)$, $V_{cqn}(t)$, and $V_{crn}(t)$. For example, equations (1) become $$V_n(t) = V_{mxr}(t) \cos(2\theta_r - 2\theta_n) \cos(\omega_{xr}t + \psi_{xr}) - V_{myr}(t) \sin(2\theta_r - 2\theta_n) \cos(\omega_{yr}t + \psi_{yr}) +$$

$$V_{can}(t)U_{an}(t) + V_{cqn}(t)U_{qn}(t) + V_{crn}(t)U_{rn}(t) \quad (16)$$

Figure 3:
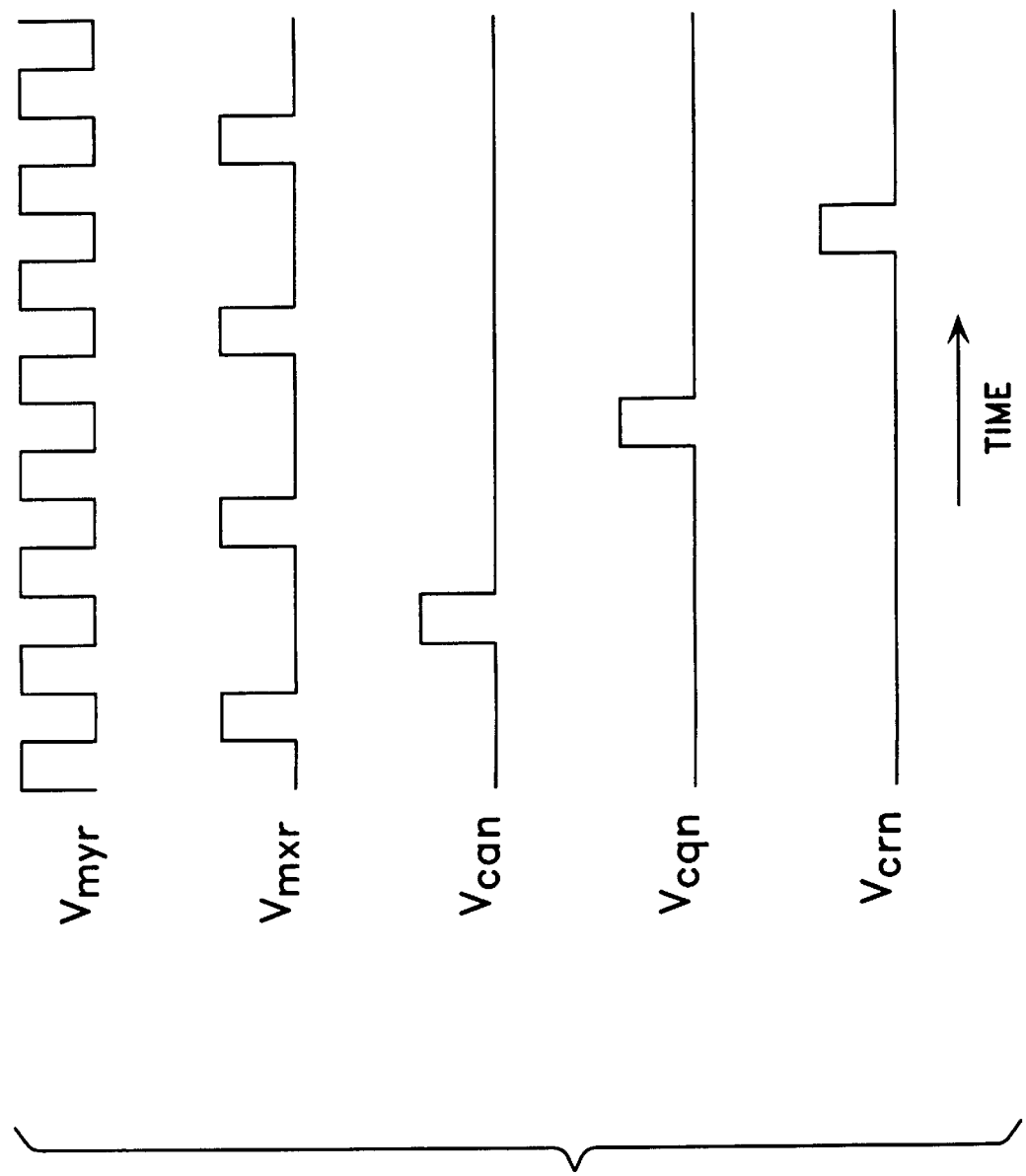
FIG. 3 shows the multiplex control signals for a particular embodiment of the invention.

One possible time-division-multiplex configuration is a sixteen-slot frame of duration $32\pi/\omega$ synchronized to the flexure rate of the resonator. The multiplex control voltages are as shown in FIG. 3. When $\theta_r$ equals $\theta$, the $x_r$ axes coincide with the antinodal axes and the $y_r$ axes coincide with the nodal axes. Eight slots are assigned to reading out the $y_r$ signal component, 4 slots to reading out the $x_r$ signal component, and 1 slot each to apply amplitude, quadrature, and rate forces to the resonator. For a vibration frequency of 4 kHz, readouts of the $x_r$ and $y_r$ signal components would be available at a rate of 2 kHz and 1 kHz respectively. The control voltages would be applied at a rate of 0.25 kHz.

In general, the signals $S_x(t)$ and $S_y(t)$ exiting from the amplifier-demultiplexer 44 have the form $$S_x(t) = K_{Vx} R_x(t)$$

$$S_y(t) = K_{Vy} R_y(t) \quad (17)$$

where $K_{Vx}$ and $K_{Vy}$ each equals $K_V$ except in the case of time-division multiplexing when $K_{Vx}$ equals $K_V V_{mx}(t)$ and $K_{Vy}$ equals $K_V V_{my}(t)$.

In order to extract the standing-wave parameters from the signals $S_x(t)$ and $S_y(t)$, a stable and precise replica of the resonator vibration signal $\cos(\omega t + \phi)$ is required. The replica is obtained from a voltage-controlled oscillator in replica generator 52 wherein the voltage-controlled oscillator is phase-locked to the in-phase standing-wave antinodal signal. The first step of the process is to multiply $S_x(t)$ and $S_y(t)$ first by the replica signal $\cos(\omega_r t + \phi_r)$ and lowpass filter the results and then by the phase-shifted replica $\sin(\omega_r t + \phi_r)$ and lowpass filter the results. The results of this process are:

$$S_{ix}(t) = K\{d_i \cos(2\theta - 2\theta_r) \cos[(\omega_r - \omega)t + (\phi_r - \phi)] + d_q \sin(2\theta - 2\theta_r) \sin[(\omega_r - \omega)t + (\phi_r - \phi)]\}$$

$$S_{iy}(t) = K\{d_i \sin(2\theta - 2\theta_r) \cos[(\omega_r - \omega)t + (\phi_r - \phi)] - d_q \cos(2\theta - 2\theta_r) \sin[(\omega_r - \omega)t + (\phi_r - \phi)]\}$$

$$S_{qx}(t) = K\{d_i \cos(2\theta - 2\theta_r) \sin[(\omega_r - \omega)t + (\phi_r - \phi)] - d_q \sin(2\theta - 2\theta_r) \cos[(\omega_r - \omega)t + (\phi_r - \phi)]\}$$

$$S_{qy}(t) = K\{d_i \sin(2\theta - 2\theta_r) \sin[(\omega_r - \omega)t + (\phi_r - \phi)] + d_q \cos(2\theta - 2\theta_r) \cos[(\omega_r - \omega)t + (\phi_r - \phi)]\} \quad (18)$$

where K is a constant.

The next step is to form the following combinations of products of the $S_{ix}(t)$, $S_{iy}(t)$, $S_{qx}(t)$, and $S_{qy}(t)$:

$$E = S_{ix}^2 + S_{qx}^2 + S_{iy}^2 + S_{qy}^2 = K^2(d_i^2 + d_q^2)$$

$$Q = 2(S_{ix}S_{qy} - S_{iy}S_{qx}) = K^2(2d_i d_q)$$

$$R = S_{ix}^2 + S_{qx}^2 - S_{iy}^2 - S_{qy}^2 = K^2(d_i^2 - d_q^2) \cos(4\theta - 4\theta_r)$$

$$S = 2(S_{ix}S_{iy} + S_{qx}S_{qy}) = K^2(d_i^2 - d_q^2) \sin(4\theta - 4\theta_r)$$

$$L_i = 2(S_{ix}S_{qx} + S_{iy}S_{qy}) = K^2(d_i^2 - d_q^2) \sin[2(\omega_r - \omega)t + 2(\phi_r - \phi)] \quad (19)$$

With $L_i(t)$ as the error signal, the phase-locked loop will lock up with the replica phase $\phi_r$ equal to $\phi$ and $\omega_r$ equal to $\omega$.

The difference between the standing-wave orientation angle and the tracking angle $\theta - \theta_r$, can be determined from the equation $$\tan(4\theta - 4\theta_r) = \frac{S(t)}{R(t)} \quad (20)$$

and the signs of $S_{ix}(t)$ and $S_{iy}(t)$. The quantity $S(t)$ can be used as the error signal in a control loop which generates $\theta_r$ and causes on average $\theta$ to equal $\theta_r$ and $d/dt(\theta - \theta_r)$ to equal 0. The digitally-synthesized tracking angle $\theta_r$ is used in generating $\sin \theta_r$ and $\cos \theta_r$ which are supplied to the multiplexer 48. The actual value of $\theta$ at any given time is given by $$\theta = \theta_r + \frac{1}{4}\tan^{-1}\frac{S(t)}{R(t)} \approx \theta_r + \frac{1}{4}\frac{S(t)}{R(t)} \quad (21)$$

The quantities $S(t)$ and $R(t)$ can also be used to generate forces for application to the resonator which will cause the orientation angle to change until it is equal to a given tracking angle.

The difference between $E(t)$ and a specified number is used as the error signal in the amplitude control loop which causes the total energy in the combined inphase and quadrature standing waves, which is proportional to $d_i^2 + d_q^2$, to equal the specified number.

The quantity $Q(t)$ is used as the error signal in the quadrature control loop which results in the quadrature standing-wave amplitude $d_q$ to be zero. When this loop is closed, the amplitude control loop maintains the inphase amplitude $d_i$ at a specified value.

The use of the above control variables can be shown to be optimum. It will be apparent to those skilled in the art that there are many choices of control variables that are suboptimum but still practical.

The outputs of the control unit 50 are the functions $U_n(t)$ together with the sine and cosine of $\theta_r$, which are all supplied to multiplexer 48.

For the purpose of obtaining a reliable source for double-oscillation-frequency ($2\omega$) sinusoids, equation (1) is modified by including the quantities $S_x$ and $S_y$ that are independent of n.

$$V_n(t) = V_{mxr}(t)[\cos(2\theta_r - 2\theta_n) + S_x/2] \cos(\omega_{xr}t + \psi_{xr}) - V_{myr}(t)[\sin(2\theta_r - 2\theta_n) - S_y/2] \cos(\omega_{yr}t + \psi_{yr}) + V_{cn}(t)U_n(t) \quad (22)$$

Equation (2) remains valid, but equation (3) becomes $$I_n(t) = \quad (23)$$

$$K_I C_n \{V_{mxr}(t)\omega_{xr}[\cos(2\theta_r - 2\theta_n) + S_x/2]\cos(\omega_{xr}t + \psi_{xr}) - V_{myr}(t) \omega_{yr}[\sin(2\theta_r - 2\theta_n) - S_y/2]\cos(\omega_{yr}t + \psi_{yr}) + V_{cn}(t)\omega_{Un}U_n(t)\}$$

Substituting the above expression in equation (2), we obtain $$I(t) = \quad (24)$$

$$K_I V_{mxr}(t)\omega_{xr}\cos(\omega_{xr}t + \psi_{xr})\left[\sum_{n=1}^{N} C_n \cos(2\theta_r - 2\theta_n) + S_x/2 \sum_{n=1}^{N} C_n\right] -$$

$$K_I V_{myr}(t)\omega_{yr}\cos(\omega_{yr}t + \psi_{yr})\left[\sum_{n=1}^{N} C_n \sin(2\theta_r - 2\theta_n) - \right.$$

$$\left. S_y/2 \sum_{n=1}^{N} C_n\right] + K_I \sum_{n=1}^{N} C_n V_{cn}(t)\omega_{Un} U_n(t)\Bigg\}$$

A more accurate expression for $C_n$ than that given by equation (4) is $$C_n = \frac{C_0}{1 - w/d} = C_0[1 + (w/d) + (w/d)^2 + \ldots] \quad (25)$$

where d is the electrode gap and $$w/d = d_i \cos(2\theta - 2\theta_n) \quad (26)$$

If we retain only the zero, first, and second order terms, we obtain $$C_n = C_0\{1 + d_i \cos(2\theta - 2\theta_n) \cos(\omega t + \phi) + \tfrac{1}{4} d_i^2 [1 + \cos(4\theta - 4\theta_n)][1 + \cos(2\omega t + 2\phi)]\} \quad (27)$$

We have assumed for simplicity that $d_q$ is zero as it would normally be in an operating vibratory rotation sensor.

Assuming that $$\sum_{n=1}^{N} \exp(j2\theta_n) = \sum_{n=1}^{N} \exp(j4\theta_n) = 0 \quad (28)$$

we obtain the following expressions for the summations in equation (24).

$$\sum_{n=1}^{N} C_n \cos(2\theta_r - 2\theta_n) = \frac{N}{2} C_0 \Big\{ d_i \cos(2\theta - 2\theta_n) \cos(\omega t + \phi) + \frac{1}{4} d_i^2 [1 + \cos(2\omega t + 2\phi)] \frac{1}{N} \sum_{n=1}^{N} \cos(4\theta + 2\theta_r - 6\theta_n) \Big\} \quad (29)$$

$$\sum_{n=1}^{N} C_n \sin(2\theta_r - 2\theta_n) = \frac{N}{2} C_0 \Big\{ -d_i \sin(2\theta - 2\theta_n) \cos(\omega t + \phi) + \frac{1}{4} d_i^2 [1 + \cos(2\omega t + 2\phi)] \frac{1}{N} \sum_{n=1}^{N} \sin(4\theta + 2\theta_r - 6\theta_n) \Big\} \quad (30)$$

$$\sum_{n=1}^{N} C_n = N C_0 \Big\{ 1 + \frac{1}{4} d_i^2 [1 + \cos(2\omega t + 2\phi)] \Big\} \quad (31)$$

For the special (but common) case of equally-spaced electrodes, we have $$\frac{1}{N} \sum_{n=1}^{N} \sin(6\theta_n) = 0 \quad (32)$$

$$\frac{1}{N} \sum_{n=1}^{N} \cos(6\theta_n) = \delta_{N3} + \delta_{N6} \quad (33)$$

where $\delta_{ij}$ is the Kroneker delta:

$$\delta_{ij} = \begin{cases} 0; & i \neq j \\ 1; & i = j \end{cases} \quad (34)$$

With these results, we write the counterpart of equation (5) as $$I(t) = \frac{N}{2} K_I C_0 V_{mxr}(t) \omega_{xr} \cos(\omega_{xr} t + \Psi_{xr}) d_i \cos(2\theta - 2\theta_n) \cos(\omega t + \phi) + $$

$$(\delta_{N3} + \delta_{N6}) \frac{N}{2} K_I C_0 V_{mxr}(t) \omega_{xr} \cos(\omega_{xr} t + \Psi_{xr}) \frac{1}{4} d_i^2 \cos(4\theta + 2\theta_r)[1 + \cos(2\omega t + 2\phi)] + $$

$$\frac{N}{2} K_I C_0 V_{mxr}(t) \omega_{xr} \cos(\omega_{xr} t + \Psi_{xr}) S_x \Big\{ 1 + \frac{1}{4} d_i^2 [1 + \cos(2\omega t + 2\phi)] \Big\} + $$

$$\frac{N}{2} K_I C_0 V_{myr}(t) \omega_{yr} \cos(\omega_{yr} t + \Psi_{yr}) d_i \sin(2\theta - 2\theta_n) \cos(\omega t + \phi) - $$

$$(\delta_{N3} + \delta_{N6}) \frac{N}{2} K_I C_0 V_{myr}(t) \omega_{yr} \cos(\omega_{yr} t + \Psi_{yr}) \frac{1}{4} d_i^2 \sin(4\theta + 2\theta_r)[1 + \cos(2\omega t + 2\phi)] + $$

$$\frac{N}{2} K_I C_0 V_{myr}(t) \omega_{yr} \cos(\omega_{yr} t + \Psi_{yr}) S_y \Big\{ 1 + \frac{1}{4} d_i^2 [1 + \cos(2\omega t + 2\phi)] \Big\} + \quad (35)$$

$$\sum_{n=1}^{N} K_I V_{cn}(t) \omega_{Un} U_n(t) C_n$$

The counterparts of equation (7) and (8) are $$V(t) = K_V [V_x(t) R_x(t) + V_y(t) R_y(t)] + K_F \sum_{n=1}^{N} V_{cn}(t) \omega_{Un} U_n(t) C_n \quad (36)$$

where $K_V$ and $K_F$ are constants and $V_x(t) = V_{mxr}(t) \omega_{xr} \cos(\omega_{xr} t + \psi_{xr})$ $V_y(t) = V_{myr}(t) \omega_{yr} \cos(\omega_{yr} t + \psi_{yr})$ $R_x(t) = S_x + d_i \cos(2\theta - 2\theta_n) \cos(\omega t + \phi) + \frac{1}{4} d_i^2 [S_x + (\delta_{N3} + \delta_{N6}) \cos(4\theta + 2\theta_r)][1 + \cos(2\omega t + 2\phi)]$ $R_y(t) = S_y + d_i \sin(2\theta - 2\theta_n) \cos(\omega t + \phi) + \frac{1}{4} d_i^2 [S_y + (\delta_{N3} + \delta_{N6}) \sin(4\theta + 2\theta_r)][1 + \cos(2\omega t + 2\phi)]$ (37)

It was shown previously that the demodulation of $V(t)$ results in equations having the form $S_x(t) = K_{Vx} R_x(t)$ $S_y(t) = K_{Vy} R_y(t)$ (38)

where $K_{Vx}$ and $K_{Vy}$ each equals $K_V$ except in the case of time-division multiplexing when $K_{Vx}$ equals $K_V V_{mx}(t)$ and $K_{Vy}$ equals $K_V V_{my}(t)$. We note that $S_x(t)$ and $S_y(t)$ consist of a DC term, a ($1\omega$) sinusoid, and a ($2\omega$) sinusoid.

Generally speaking, the ($2\omega$) sinusoid can be extracted from either $S_x(t)$ and $S_y(t)$ by a simple bandpass filtering technique. Note that except for the contributions from the excitation signals $S_x$ and $S_y$ (not to be confused with $S_x(t)$ and $S_y(t)$), the ($2\omega$) sinusoid vanishes identically for all $N$ values other than $N=3$ and $N=6$. For $N=3$ and $N=6$, the contribution from this term to $S_x(t)$ is proportional to $\cos(4\theta + 2\theta_r)$ and the contribution from this term to $S_y(t)$ is proportional to $\sin(4\theta + 2\theta_r)$. Thus, in the force-to-rebalance operating mode wherein $\theta$ and $\theta_r$ are both equal to zero, this contribution to the ($2\omega$) sinusoid is only available from $S_x(t)$ where it is difficult to extract in the presence of the much larger ($1\omega$) sinusoid. In a whole-angle-tracking mode $\theta$ and $\theta_r$ are equal and here this contribution to the ($2\omega$) sinusoid is distributed according to $S_x(t) \sim \cos(6\theta)$ and $S_y(t) \sim \sin(6\theta)$.

The contributions to the ($2\omega$) sinusoid from the excitation terms $S_x$ and $S_y$ are imposed by design to yield a reliable ($2\omega$) sinusoid which is the same for every gyro regardless of the number of electrodes and independent of the standing-wave location. In particular, one can make the choice $S_x$ equal to 0 and $S_y$ equal to a prescribed value. Then in both the force-to rebalance and whole-angle-tracking modes, the ($2\omega$) sinusoid appears only in $S_y(t)$ where it is most easily extracted.

The ($2\omega$) sinusoid can also be extracted from the signals that arise as a result of the $V_B$ DC bias of the resonator. The current $I_{nB}$ flowing from the $n$'th electrode as a result of the $V_B$ bias is given by $$I_{nB} = \frac{dC_n}{dt} V_B \quad (39)$$

Taking the time derivative of equation (27), we obtain $$\frac{dC_n}{dt} = -C_o \{d_i \omega \cos(2\theta - 2\theta_n) \sin(\omega t + \phi) + \frac{1}{4} d_i^2 2\omega [1 + \cos(4\theta - 4\theta_n)] \sin(2\omega t + 2\phi)\} \quad (40)$$

and $I_{nB} = -C_o V_B \{d_i \omega \cos(2\theta - 2\theta_n) \sin(\omega t + \phi) + \frac{1}{4} d_i^2 2\omega [1 + \cos(4\theta - 4\theta_n)] \sin(2\omega t + 2\phi)\}$ (41)

Summing over n to obtain $I(t)$, we obtain $I(t) = -C_o V_B N \frac{1}{4} d_i^2 2\omega \sin(2\omega t + 2\phi)$ (42)

where we have assumed that $$\sum_{n=1}^{N} \exp(j 2\theta_n) = \sum_{n=1}^{N} \exp(j 4\theta_n) = 0 \quad (43)$$

Since $I(t)$ is transformed by amplifier-demodulator 44 into a voltage proportional to $I(t)$, the ($2\omega$) sinusoid is directly available in the amplifier-demodulator 44.

As we mentioned above, a stable and precise replica of the resonator vibration signal $\cos(\omega t + \phi)$ is required for the extraction of the standing-wave parameters from the signals $S_x(t)$ and $S_y(t)$. The availability of the double-frequency sinusoid simplifies the process of obtaining this stable and precise replica.

Additional details concerning vibratory rotation sensors are contained in U.S. Pat. No. 4,951,508 by Loper, Jr. et al. dated Aug. 28, 1990 which is incorporated by reference.

What is claimed is:

1. Apparatus comprising:

a housing;

a resonator attached to the housing;

first and second sets of electrodes, one set being attached to the housing, the other set being attached to the resonator, the first set opposing the second set, each set consisting of one or more electrodes;

a signal processor having one or more input ports capacitively connected to one or more of the first set of electrodes, the signal processor extracting from the signals appearing at the one or more input ports one or more double-frequency sinusoids having frequencies of twice the frequency of oscillation of the resonator.

2. The apparatus of claim 1 wherein the signal processor comprises:

a bandpass filter having a passband that includes a frequency equal to twice the frequency of oscillation of the resonator, the input to the bandpass filter being a scaled version of the signal at an input port, the output of the bandpass filter being a double-frequency sinusoid having a frequency of twice the frequency of oscillation of the resonator.

3. The apparatus of claim 1 wherein the signal processor comprises:

an oscillator that produces an output signal with a controllable frequency, the oscillator output signal being phase-locked to the double-frequency sinusoid contained in the signal at an input port having a frequency of twice the frequency of oscillation of the resonator.

4. The apparatus of claim 1 wherein the signal processor comprises:

a demodulator that extracts a demodulated signal from the signal at an input port, the demodulated signal containing a double-frequency sinusoid having a frequency of twice the frequency of oscillation of the resonator.

5. The apparatus of claim 4 wherein the signal processor further comprises:

a bandpass filter having a passband that includes a frequency equal to twice the frequency of oscillation of the resonator, the input to the bandpass filter being the demodulated signal, the output of the bandpass filter being a double-frequency sinusoid having a frequency of twice the frequency of oscillation of the resonator.

6. The apparatus of claim 4 wherein the signal processor further comprises:

an oscillator that produces an output signal with a controllable frequency, the oscillator output signal being phase-locked to the double-frequency sinusoid contained in the demodulated signal having a frequency of twice the frequency of oscillation of the resonator.

7. The apparatus of claim 1 further comprising:

an excitation signal generator for generating one or more excitation signals that are applied to one or more of the electrodes of the second set of electrodes, at least one of the one or more excitation signals including an additive component consisting of the product of a first function and a second function, the first function being a constant or a non-trigonometric function, the second function being a periodic function having a frequency greater than the frequency of oscillation of the resonator.

8. The apparatus of claim 7 wherein at least one of the one or more excitation signals includes a first additive component and a second additive component.

9. The apparatus of claim 7 wherein an excitation signal is applied to each of the electrodes of the second set of electrodes, each excitation signal including the same additive component.

10. The apparatus of claim 8 wherein an excitation signal is applied to each of the electrodes of the second set of electrodes, each excitation signal including the same first additive component and the same second additive component.

11. A method for obtaining a double-frequency sinusoid having a frequency equal to twice the frequency of oscillation of a resonator attached to a housing in a vibratory rotation sensor comprising first and second sets of electrodes, one set being attached to the housing, the other set being attached to the resonator, the first set opposing the second set, each set consisting of one or more electrodes, the method comprising the steps:

(a) applying a voltage across a resonator electrode and an opposing housing electrode;

(b) obtaining a measure of the current flowing between the resonator electrode and the housing electrode as a function of time;

(c) extracting the double-frequency sinusoid from the current measure.

12. The method of claim 11 wherein step (c) comprises the steps:

(c1) performing one or more operations on the current measure that suppress component signals having frequencies other than the frequency of the double-frquency sinusoid.

13. The method of claim 11 wherein step (c) comprises the steps:

(c1) generating a double-frequency sinusoid utilizing the double-frequency sinusoid contained in the current measure.

14. The method of claim 11 wherein step (c) comprises the steps:

(c1) obtaining a demodulated current measure from the current measure, the current measure having component signals with frequencies equal to the resonator oscillation frequency and the frequency of the double-frequency sinusoid.

(c2) performing one or more operations on the demodulated current measure that suppress component signals having frequencies other than the frequency of the double-frequency sinusoid.

15. The method of claim 11 wherein step (c) comprises the steps:

(c1) obtaining a demodulated current measure from the current measure, the demodulated current measure having component signals with frequencies equal to the resonator oscillation frequency and the frequency of the double-frequency sinusoid.

(c2) generating a double-frequency sinusoid utilizing the double-frequency sinusoid contained in the demodulated current measure.

16. The method of claim 11 wherein in step (a) the voltage includes a DC component.

17. The method of claim 11 wherein in step (a) the voltage includes an AC component.

18. The method of claim 11 wherein step (a) comprises the step:

(a1) generating one or more excitation signals that are applied to one or more of the electrodes of the second set of electrodes, at least one of the one or more excitation signals including at least one additive component consisting of the product of a first function and a second function, the first function being a constant or a non-trigonometric function, the second function being a periodic function having a frequency greater than the frequency of oscillation of the resonator.

19. The method of claim 18 wherein at least one of the one or more excitation signals includes a first additive component and a second additive component.

20. The method of claim 18 wherein an excitation signal is applied to each of the electrodes of the second set of electrodes, each excitation signal including the same additive component.

21. The method of claim 18 wherein an excitation signal is applied to each of the electrodes of the second set of electrodes, each excitation signal including the same first additive component and the same second additive component.

* * * * *